Jan. 5, 1965 R. A. URBAN 3,164,730

ESAKI DIODE LOGIC CIRCUIT

Filed July 2, 1962

INVENTOR
ROGER A. URBAN
BY Herbert Amermayer
ATTORNEY

United States Patent Office
3,164,730
Patented Jan. 5, 1965

3,164,730
ESAKI DIODE LOGIC CIRCUIT

Roger A. Urban, St. Paul, Minn., assignor to Sperry Rand Corporation, New York, N.Y., a corporation of Delaware Filed July 2, 1962, Ser. No. 206,899
5 Claims. (Cl. 307—88.5)

The present invention relates generally to an improved logical circuit, and more particularly to an improved logical circuit which is adapted for "MAJORITY" and "AND" determinations, the circuit employing Esaki diodes and being capable of reliable operation with reasonable tolerance levels.

In the utilization of Esaki diodes (sometimes referred to as "tunnel diodes") in a circuit to perform logical functions, it is generally essential that extremely close tolerance levels be established on certain of the Esaki diode parameters. These close tolerance levels were also necessary in and applicable to the resistors, power supplies and other components of the system in order that the entire functioning unit would meet the required tolerance level. For example, the normal Esaki diodes logic circuit requires a tolerance level of about 1% on all parameters, this being substantially higher than the tolerance level required in the present circuit, which with presently available Esaki diodes is in the range of about 3%. This circuit is capable of operating asynchronously and unilaterally, and in large blocks the logic can be made to operate on one phase if desired. It is a further feature of the present invention that a high voltage clock may be used which eliminates the problem of achieving high speeds with a low impedance clock.

Briefly, the Esaki diode logic circuit of the present invention employs a plurality of logical legs which are operatively associated with a certain condition responsive stage. Each of the logical legs is disposed in electrical parallel relationship with the condition responsive stage, the immediate operating characteristics of the logical legs being utilized to determine the appropriate operating characteristics and correspondingly the output of the condition responsive stage. Each of the logical legs in turn utilizes an Esaki diode which is responsive to the state of its various inputs. Between the Esaki diode of each leg and the node which comprises the input to the condition responsive stage, there is disposed in series, a current steering network. The current steering network employs a pair of unilateral conducting devices such as diodes having substantially different forward operating characteristics, these diodes being arranged in back-to-back relationship. In this manner, it is possible to control and monitor the manner in which current flows into the current sink through the unilateral conducting devices or diodes in such a way that the nature of the output of the individual leg as seen by the condition responsive stage may be carefully controlled. Inasmuch as the normal current level in the condition responsive stage lies within the critical operating range of the Esaki diode included therein, current which may flow into any of the logical legs from the common node will in turn determine the operating level of that Esaki diode and accordingly the entire condition responsive stage.

Therefore it is an object of the present invention to provide an improved logical circuit which is particularly adapted for "MAJORITY" and "AND" functions utilizing an Esaki diode arrangement capable of use with wide circuit tolerances.

It is further an object of the present invention to provide an improved Esaki diode logic circuit which employs a current steering means having a pair of diodes arranged in back-to-back relationship with a current sink, the diodes being adapted to control and monitor current flow to the current sink in a predetermined fashion and in a predetermined sequence.

It is yet a further object of the present invention to provide an improved logical circuit which is particularly adapted for "MAJORITY" and "AND" determinations utilizing a plurality of Esaki diodes, and further utilizing a plurality of logical legs, each logical leg including a current steering assembly or portion in which a pair of backward diodes are arranged in back-to-back relationship, the backward diodes having substantially differing forward impedances.

Other and further objects of the present invention will become apparent to those skilled in the art upon a study of the following specification, appended claims and accompanying drawings, wherein:

Figures 2, 3, 4:
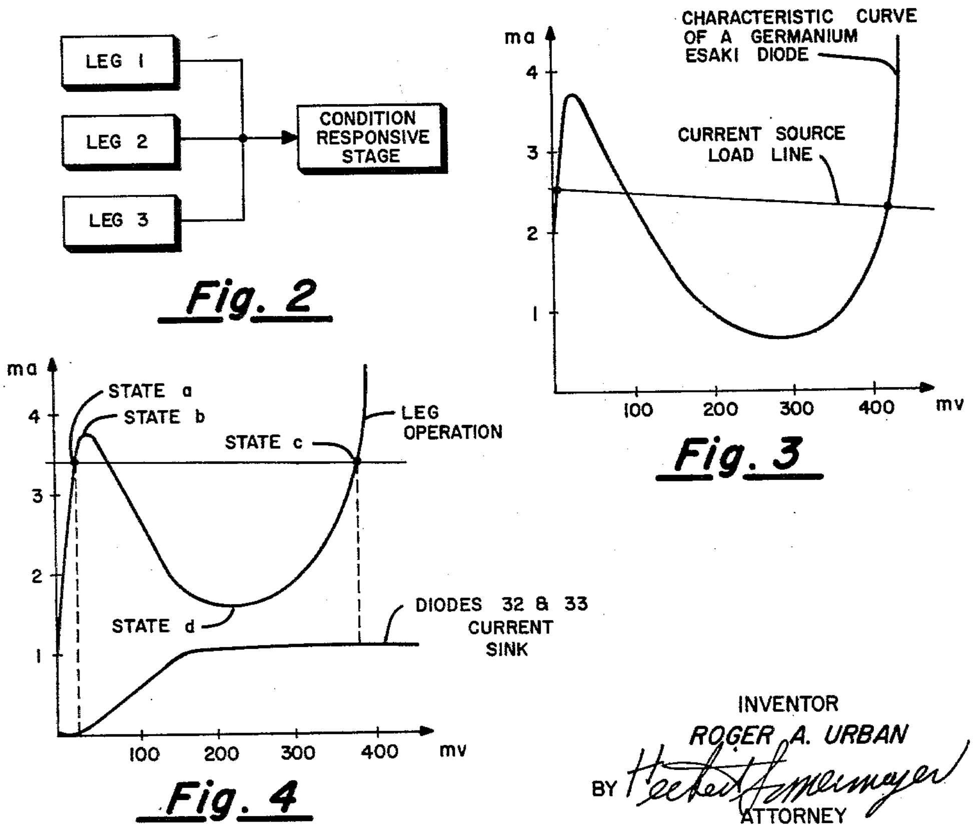
FIGURE 2 is a block diagram of a logical "MAJORITY" circuit in accordance with the present invention.

FIGURE 3 is a characteristic curve of a typical germanium Esaki diode showing a load line derived from a current source arranged in series with the diodes; and, FIGURE 4 is a plot of a characteristic curve for an Esaki diode as shown in FIGURE 3, the curve representing the Esaki diode in parallel with a current steering circuit, and superimposed thereon, a plot of a curve representing the characteristic of a current steering circuit including a pair of backward diodes arranged in back-to-back relationship with a current sink.

Figure 1:
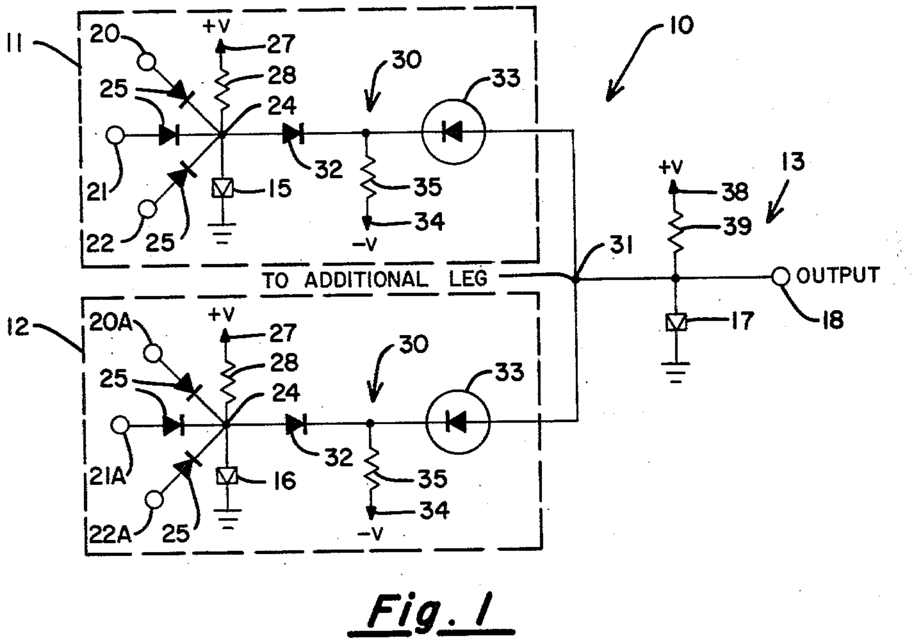
FIGURE 1 is a schematic diagram of a logical circuit arranged in accordance with the preferred modification in the present invention.

In accordance with the preferred modification of the invention as illustrated in FIGURE 1, the logical circuit generally designated 10 includes a pair of logical legs 11 and 12 together with a condition responsive output stage 13. If desired, particularly for "MAJORITY" decision circuits, additional legs may be employed in the system, such as is shown in FIGURE 2. However, inasmuch as each of the logical leg units are identical, one to another, it is sufficient that the pair of legs 11 and 12 be shown for purposes of illustration. Each of the logical legs as well as the condition responsive stage is provided with an Esaki diode, such as the Esaki diodes 15 and 16, and the condition responsive stage is provided with Esaki diode 17. The state of operation, that is, low voltage state operation or high voltage state operation, of the Esaki diodes 15 and 16 will together determine the state of operation of the Esaki diode 17. Accordingly the state of operation of Esaki diode 17 may be read from the output terminal 18, as indicated.

Referring now specifically to each of the logical legs, inasmuch as the components included therein are identical, one to another, reference will be made to but one logical leg, the internal operation of each leg being identical for purposes of the system. A plurality of inputs are provided, such as at 20, 21, and 22, these inputs being isolated from the internal node 24 by the individual diodes 25—25. A biasing source such as is indicated at 27 is also provided, the source being coupled to the internal node 24 through resistor 28. As is indicated, Esaki diodes 15 and 16 are connected between the node 24 and ground. A current steering means generally designated 30 is interposed in each leg between internal node 24 and external node 31, node 31 being utilized as the input to the condition responsive stage 13. In each of the current steering means 30—30, a first diode 32, and a second diode 33 are arranged in back-to-back relationship, with a current sink in the form of a source of negative potential 34 together with a coupling resistor 35 being disposed between the back-to-back diodes 32 and 33. Inasmuch as the source of negative bias 34 as well as the resistor 35 are each of constant value, a current of constant maximum value will flow through the current sink at all times during operation of the system. The relative magnitudes of current which are extracted from the nodes 24 and 31 are determined by the immediate operating characteristics of the Esaki diodes 15 and 16 and the characteristics of the individual diodes 32 and 33.

Referring now to the condition responsive stage, it will be observed that a source of bias potential 38 is coupled through resistor 39 to the input of the Esaki diode 17, diode 17 being arranged between the parallel sources including the external node 31 and bias potential on one side and ground on the other side.

Referring now to the arrangement of backward diodes 32 and 33, it is essential that these individual diodes have substantially different forward impedances. In this connection, it is preferred that diode 32 have a higher forward impedance than diode 33. One way of accomplishing this distinction is to select diodes 32 and 33 from significantly different materials, diodes 32 being, for example, silicon, while 33 may be fabricated from germanium. In order that significantly different forward impedances will be encountered in the individual diodes 32 and 33, these diodes are preferably backward diodes, however other suitable diodes may be employed. Based upon this explanation, it will be appreciated that the characteristics of diode 33 must permit forward conduction at a substantially lower potential level than diode 32.

Referring now to the operation of the system, the operating characteristics curve of the typical germanium Esaki diode is shown in FIGURE 3. The load line, as indicated, represents the "current source" which is arranged in series with Esaki diode 17, this load line intersecting the diode operating curve at three points, two of which cross the curve in a positive resistance area and thereby being stable, the third crossing the operating curve in a negative resistance stage. This negative resistance area represents an unstable operating point. The diode will remain at state *a* as indicated in FIGURE 4 until the current exceeds the peak current as at *b*; at which point the unit will switch to state *c*. Operation in state *c* will be maintained until the current decreases to a value less than the valley current such as at *d* at which point the diode will switch back to an operating point along the slope operating point where *a* resides. This basic operation is common between the Esaki diodes 15, 16, and 17.

Referring now again to the individual legs 11 and 12, it will be observed that leg 11, for example, will draw a certain quantity of current from node 31 when Esaki diode 15 is operating along the stable operating point indicated *a* and will draw no current from this node when Esaki diode 15 is in state *c*. Leg 12 operates in an identical fashion. Inasmuch as the state of Esaki diodes 15 and 16 is determined by the nature of the inputs 20, 21, 22 and 20*a*, 21*a* and 22*a* respectively, the pre-setting of either or both of these Esaki diodes will control the nature of the operation of Esaki diode 17. The current introduced to the system through the source 38 is adjusted in order that the level is sufficient to drive Esaki diode 17 to state *c*, provided no current is flowing into either or any of the legs adjoining node 31. On the other hand, for example, if either or both legs are drawing current from node 31 because of the operating nature of the respective Esaki diode, the current source will be insufficient to drive Esaki diode 17 into operating state *c*. It will be appreciated that circuit parameters may be adjusted and accordingly adapted to perform the logical "AND" functions as well as "MAJORITY" functions.

Assuming that the output node 31 is at a potential of, for example, 50 mv. the operation of the system will be as follows. Reference is made to the lower curve designated in FIGURE 4, which curve illustrates the function of the current steering system in combination with the current sink. In this representation, the lower curve of FIGURE 4 represents the characteristics of a circuit containing, for example, diodes 32 and 33 together with resistor 35 and potential source 34, source 34 being capable of maintaining, for example, a constant bias in the range of —10 volts. FIGURE 4 also includes a curve representing an Esaki diode such as the diode 15 in parallel with the current steering circuit, this plot being shown as it appears looking into diode 32. In this case, therefore, the Esaki diode 15 constitutes a current source delivering 3.7 ma. to the current sink. When the Esaki diode 15 is operating at 3.7 ma. while it is in state *a* there will be a negligible current flow into the current steering system from Esaki diode 15, and the current sink will then draw 1 ma. through the diode 33. When the Esaki diode 15 is in state *b* the current flow of 1 ma. will move through diode 32 and into the current sink. Under these circumstances, there will be no current flow through diode 33, the current sink extracting its requirements through diode 32. The state of the individual inputs 20, 21, and 22 will collectively or individually determine the potential at node 24 and accordingly the immediate status of Esaki diode 15.

The high tolerances available in the circuit are achieved because of the location of the relatively steep rise in the lower curve of FIGURE 3. The current which may flow into each leg from node 31 is clamped at a maximum of 1 ma. even though the voltage in the Esaki diode 15 may vary widely while it resides in the high voltage state, or in this example, state *c*. These differences in state *c* voltages are even more pronounced between different Esaki diodes. So long as the steep portion of the curve is confined to a region of higher potential than the first peak of the Esaki diode and lower potential than the highest operating potential of the Esaki diode, it is relatively easy to achieve proper control. Inasmuch as the diode 33 has a lower forward impedance than diode 32, current will preferentially flow through diode 33 whenever the Esaki diodes 15 and 17 are in the same state, flow through diode 32 in effect being effectively blocked in this case.

Relating this operation to the function of the system, in one typical embodiment the individual legs are arranged to function as an "AND" gate. Any input 20, 21 or 22 of leg 11 or any input 20*a*, 21*a* of leg 12 is capable of "setting" or driving the Esaki diodes 15 and 16 respectively to the high voltage state. With a positive bias of 3.75 volts separated from node 24 by a 1.1K resistor, a constant current of 3.4 ma. will normally be available to the Esaki diodes 15 and 16. Inasmuch as the peak current level of the diode is about 3.7 ma., each of the individual inputs is capable of delivering about 0.4 ma. through the isolating diodes and ultimately to node 24. Therefore, any of the individual inputs will be capable of driving the individual Esaki diodes 15 or 16 into the high voltage state. Assuming that one of the legs, for example leg 11, has been treated so as to drive the Esaki diode 15 into the high voltage state, while Esaki diode 16 in leg 12 is in the low voltage state, the 4.4 ma. available at node 31 to the Esaki diode 17 will be divided in such a fashion so that 1 ma. passes into leg 12 and leg 11 will draw no current, the remaining 3.4 ma. passing to ground through Esaki diode 17. This current level is sufficient to drive Esaki diode 17 to the high voltage state and hence the output will indicate this condition. At any time, when either none or only one of the legs has an input driving a signal thereto, the condition responsive stage, represented by Esaki diode 17, will be in the high voltage stage or state. When an input 20*a*, 21*a*, or 22*a* of leg 12 is driven with a signal so as to move Esaki diode 16 into the high voltage state, and while leg 11 remains in the high voltage state, a different situation will occur. In this condition, the 4.4 ma. available at node 31 will be divided as follows: 1 ma. will move into the current steering and current sink portions of leg 11; 1 ma. will move into the current steering and current sink portions of leg 12; and the remaining 2.4 ma. will pass through Esaki diode 17 to ground. In this fashion, the output level as seen at 18 will be sufficiently low to prevent the diode from setting or tunneling to the high voltage state, and the output will indicate this condition. The individual legs 11 and 12 accordingly function together as an "AND" network. If another leg were added to the system, as indicated, and the 44 volts applied at 38 changed to 54 volts, the system could be made to perform the "MAJORITY" function in that any two legs having an Esaki diode in the high voltage state would cause Esaki diode 17 to switch to the high voltage state. The individual remaining circuit parameters would be the same as indicated in connection with the previous example. See FIGURE 2, for example.

In this circuit, utilizing the circuit components and current values set forth above, diodes 33 are preferably type L5609, and Esaki diodes designated type 1N2941 are preferred for use therewith. In this embodiment, diode 32 is preferably type S180G.

It will be appreciated that the logic circuit of the present invention may be utilized as a basic building block for various data processing operations. By appropriate manipulation of the current values, voltage values, and the like, the circuit may be utilized to perform other logical operations, including "OR" operation, "NOR" operation, and others in addition to the "AND" and "MAJORITY" functions. These various operations may be readily accomplished by appropriate selection and substitution of components.

It will be appreciated that the various specific examples given hereinabove are given for purposes of illustration only and are not to be otherwise construed as a limitation upon the scope to which the present invention is reasonably entitled. It will be understood therefore, that various modifications may be made without departing from the spirit and scope of the present invention. The claims follow.

What is claimed is:

1. Asymmetrical conducting means particularly adapted for performing logical data processing operations comprising at least two logical legs and a condition responsive output stage arranged to indicate the state of said legs, said logical legs being disposed in electrical parallel relationship with said condition responsive stage, each leg comprising a plurality of inputs, an input responsive means for indicating the state of said inputs, a logical leg output means, and a current steering means arranged intermediate said input responsive means and said logical leg output means, said current steering means including first and second unilateral conductive devices arranged in back-to-back relationship on either side of a current sink and having substantially different forward conductive characteristics whereby substantially lower impedance to current flow is encountered in said first unilateral conducting device than is encountered in said second unilateral conducting device, the input responsive stage in each logical leg and the condition responsive stage each including an asymmetrical conducting apparatus having the first stable positive impedance operating potential range and a second higher stable positive impedance operating potential range, said stable positive impedance operating potential ranges being separated by an unstable operating potential range of negative impedance, the operating potential range of the asymmetrical conducting apparatus of said input responsive means being determined by the status of said plurality of inputs, the operating potential range of the asymmetrical conducting apparatus of said condition responsive stage being determined by the operating potential range of the input responsive asymmetrical conducting apparatus.

2. Asymmetrical conducting means particularly adapted for performing logical data processing operations comprising at least two logical legs and a condition responsive output stage arranged to indicate the state of said legs, said logical legs being disposed in electrical parallel relationship with said condition responsive stage, each leg comprising a plurality of inputs, an input responsive means for indicating the state of said inputs, a logical leg output means, and a current steering means arranged intermediate said input responsive means and said logical leg output means, said current steering means including first and second unilateral conductive devices arranged in back-to-back relationship on either side of a current sink, the first unilateral conducting device being arranged between said input responsive means and said current sink, said first and second unilateral conducting devices having substantially different forward conducting characteristics whereby substantially lower impedance to current flow is encountered in said first unilateral conducting device than is encountered in said second unilateral conducting devices, the input responsive stage in each logical leg and the condition responsive stage each including an asymmetrical conducting apparatus having a first stable positive impedance operating potential range and a second higher stable positive impedance operating potential range, said positive impedance operating potential ranges being separated by an unstable operating potential range of negative impedance, said first unilateral conducting apparatus having a forward potential region of relatively high impedance and a higher forward potential region of relatively low impedance separated by a transition potential region being at a potential region substantially equal to said unstable operating potential range, the operating potential range of the asymmetrical conducting apparatus of said input responsive means being determined by the status of said plurality of inputs, the operating potential range of the asymmetrical conducting apparatus of said condition responsive stage being determined by the operating potential range of the input responsive asymmetrical conducting apparatus.

3. Asymmetrical conducting means particularly adapted for performing logical data processing operations comprising at least two logical legs and a condition responsive output stage arranged to indicate the state of said legs, said logical legs being disposed in electrical parallel relationship with said condition responsive stage, a plurality of inputs, each leg comprising a source of biased potential, an input responsive means for indicating the state of said inputs, a logical leg output means, and a current steering means arranged intermediate said input responsive means and said logical leg output means, said condition responsive output stage including a source of biased current, said currrent steering means including first and second unilateral conductive devices arranged in back-to-back relationship on either side of a current sink and having substantially different forward conductive characteristics whereby substantially lower impedance to current flow is encountered in said first unilateral conducting device than is encountered in said second unilateral conducting device for dividing the flow of current from said biased current source in accordance with the state of said logical leg inputs, the input responsive stage in each including an asymmetrical conducting apparatus having a first stable positive impedance operating potential range and a second higher stable positive impedance operating potential range, said stable positive impedance operating potential ranges being separated by an unstable operating potential range of negative impedance, the operating potential range of the asymmetrical conducting apparatus of said input responsive means being determined by the status of said plurality of inputs, the operating potential range of the asymmetrical conducting apparatus of said condition responsive stage being determined by the operating potential of the input responsive asymmetrical conducting apparatus.

4. Asymmetrical conducting means as set forth in claim 3 being particularly characterized in that said bias current source delivers current at a certain predetermined valve which exceeds the current level of said first positive impedance operating potential of the asymmetrical conducting apparatus in said condition responsive stage.

5. The asymmetrical conducting means as set forth in claim 4 being particularly characterized in that the current flow into the current steering means of either logical leg from said bias current source exceeds the difference in current between said predetermined value and the peak current level of said first stable positive impedance operating potential range.

References Cited in the file of this patent

IBM Technical Disclosure Bulletin, by Thomas, vol. 1, No. 6, April 1959, page 27.

IBM Technical Disclosure Bulletin, by Wolff, vol. 3, No. 11, April 1961, page 41.

Philco Application Lab. Report 681, by Spiegel, December 1960, pages 2–4.